(12) United States Patent
Campean (10) Patent No.: US 7,721,480 B2
(45) Date of Patent: May 25, 2010

(54) PIVOTING LENS COVERS FOR RIFLESCOPES AND THE LIKE

(75) Inventor: Daniel Campean, Portland, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 1037 days.

(21) Appl. No.: 11/271,332

(22) Filed: Nov. 10, 2005

(65) Prior Publication Data

US 2006/0218841 A1 Oct. 5, 2006

Related U.S. Application Data

(60) Provisional application No. 60/626,969, filed on Nov. 10, 2004.

(51) Int. Cl.
*F41G 1/38* (2006.01)

(52) U.S. Cl. ...................................................... 42/129

(58) Field of Classification Search ................. 396/349; 42/129
See application file for complete search history.

(56) References Cited

U.S. PATENT DOCUMENTS

| | | | |
|---|---|---|---|
| 2,488,188 A | 11/1949 | Halvorson | |
| 2,534,061 A | 12/1950 | Rogers | |
| 2,738,585 A | 3/1956 | Vissing | |
| 2,849,795 A | 9/1958 | Vissing | |
| 3,831,285 A | 8/1974 | Vissing | |
| 3,840,883 A | 10/1974 | Choate | |
| 3,942,864 A * | 3/1976 | Numbers | 359/511 |
| 4,415,242 A * | 11/1983 | Major | 359/612 |
| 5,495,676 A * | 3/1996 | Chesnut et al. | 42/129 |
| 5,561,563 A | 10/1996 | Chesnut et al. | |
| 6,033,130 A * | 3/2000 | Muroi et al. | 396/448 |
| 6,132,110 A * | 10/2000 | Kume et al. | 396/349 |
| 6,213,654 B1 | 4/2001 | Kume et al. | |
| 6,416,189 B1 | 7/2002 | Watson | |
| 6,799,854 B1 | 10/2004 | Steiner | |
| 6,811,268 B2 * | 11/2004 | Watson | 359/611 |
| 2002/0167731 A1 | 11/2002 | Watson | |
| 2003/0133709 A1 | 7/2003 | Kobayashi et al. | |

FOREIGN PATENT DOCUMENTS

DE 319977 4/1920
JP 2003172965 A * 6/2003

OTHER PUBLICATIONS

Written Opinion of the International Searching Authority for International Application No. PCT/US2005/040647, dated Mar. 9, 2006, 9 pages.

* cited by examiner

*Primary Examiner*—Troy Chambers
(74) *Attorney, Agent, or Firm*—Stoel Rives LLP

(57) ABSTRACT

A lens cover includes a cap adapted to be pivotably supported on an optical device. A stop may be positioned to interfere with spring-driven movement of the cap and to brake the cap at an intermediate position between closed and open positions thereof, and to allow the cap to be manually moved to the fully open position. An optional detent structure is disclosed for releasably retaining the cap in its open position. A mounting ring assembly of the lens cover may include a first threaded ring member for attachment to the optical device and a second ring member rotatably coupled to the first ring member for positioning a hinge that pivotably attaches the cap to the second ring member. Magnets may be included to retain the cap in the closed position. The mounting ring assembly, the cap, or both may be formed of a metal such as aluminum.

25 Claims, 7 Drawing Sheets

PIVOTING LENS COVERS FOR RIFLESCOPES AND THE LIKE

RELATED APPLICATION

This application claims the benefit under 35 U.S.C. §119 (e) of U.S. Provisional Patent Application No. 60/626,969, filed Nov. 10, 2004, which is incorporated herein by reference.

TECHNICAL FIELD

The technical field relates to optical devices, such as riflescopes, telescopes, and binoculars, for example; and, in particular, to pivoting lens covers for of such devices.

BACKGROUND

U.S. Pat. No. 2,488,188 of Halvorson, U.S. Pat. No. 2,534,061 of Rogers, U.S. Pat. No. 2,738,585 of Vissing, U.S. Pat. No. 2,849,795 of Vissing, U.S. Pat. No. 3,831,285 of Vissing, U.S. Pat. No. 5,495,676 of Chestnut et al., U.S. Pat. No. 6,416,189 of Watson, U.S. Pat. No. 6,799,854 of Steiner, U.S. Pat. No. 6,811,268 of Watson and D445,475 of Spear describe various pivoting lens caps for riflescopes and telescopic sights. The present inventor has recognized disadvantages of these designs and has identified a need for an improved pivoting lens cap having a durable weather-tight construction.

SUMMARY

In one embodiment, a cover for an eyepiece or objective of an optical sighting device comprises a mounting ring assembly supporting a hinge assembly to which a cap is pivotably attached. The mounting ring assembly is preferably adapted for attaching to an eyepiece end or objective end of a housing of the optical sighting device. A spring may operatively engage the lens cap for driving the lens cap from a closed position covering the lens of the optical sighting device, toward an open position away from the lens. The cover may include a cushioning device or stop that engages the cap during at least a portion of its spring-driven movement, for braking the movement of the cap at an intermediate position between the open and closed positions, thereby preventing the cap, when opened, from slapping against the housing of the optical sighting device. The cushioning device may also comprise part of a detent structure that engages with a portion of the hinge assembly for releasably retaining the cap in the open position.

In one embodiment, the mounting ring assembly includes a first ring member rotatably coupled to a second ring member on which a portion of the hinge assembly is formed or supported. The first ring member may include a set of external (male) threads that are sized to mate with internal (female) threads at the objective end or eyepiece end of the housing of the optical sighting device. The second ring member may be snap fit to the first ring member to form a sliding coupling therebetween, such that the pivot axis of the second ring member is coincident with the center of the first ring member. The rotatable second ring member allows the position of the hinge assembly to be selectively moved to the desired position relative to the optical sighting device when the first ring is threaded onto the optical sighting device, thereby establishing the path along which the cap swings when it is opened and closed.

In some embodiments, one or more magnets may be provided on or in the mounting ring assembly, the cap, or both, for holding the cap in the closed position via magnetic attraction. A sealing o-ring may also be interposed between inner and outer annular surfaces of the respective cap and mounting ring assembly for preventing water and dust getting past the cap when it is closed and, in some embodiments, for providing a friction fit that helps hold the cap in the closed position.

The mounting ring assembly, pivoting cap, and hinge assembly may be formed of metal, which may enhance durability and result in an improved fit for watertight sealing.

Additional aspects and advantages will be apparent from the following detailed description of preferred embodiments, which proceeds with reference to the accompanying drawings.

DETAILED DESCRIPTION OF PREFERRED EMBODIMENTS

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification do not necessarily refer to the same embodiment.

Furthermore, the described devices, features, structures, and characteristics may be combined in any suitable manner in one or more embodiments. Those skilled in the art will recognize that the inventions can be practiced without one or more of the specific details, or with other methods, components, materials, etc. In some instances, well-known structures, materials, and operations are omitted or not described in detail to avoid obscuring aspects of the embodiments.

Figure 1:
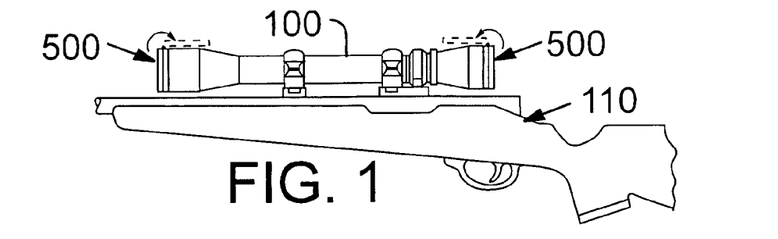
FIG. 1 is a side elevation view of a rifle and riflescope including pivoting lens covers.
Figure 2:
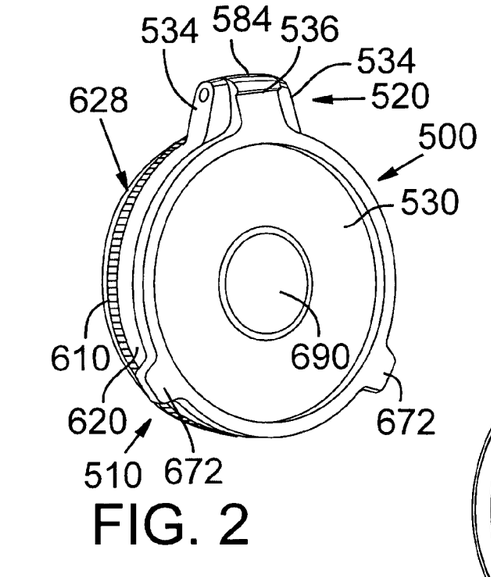
FIG. 2 is a front pictorial view of one of the lens covers of FIG. 1 in accordance with a first embodiment, with a pivoting cap of the cover shown in a closed position.
Figure 3:
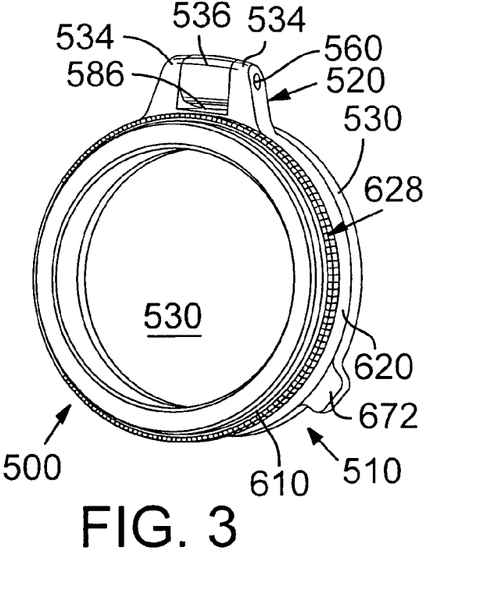
FIG. 3 is a rear pictorial view of the cover of FIG. 2.

With reference to FIG. 1, an optical sighting device 100 for a firearm 110 includes pivoting lens covers 500 attached to respective objective and eyepiece ends of a housing of optical sighting device 100. In FIG. 1, optical sighting device 100 is depicted as a riflescope. However, lens covers according to the embodiments described herein may also be suitable for covering eyepiece and objective lenses of various other optical sighting devices, such as night vision scopes, spotting scopes, telescopes, binoculars, and the like, and for covering eyepiece and objective lenses of other optical devices.

Figures 4, 5, 5A:
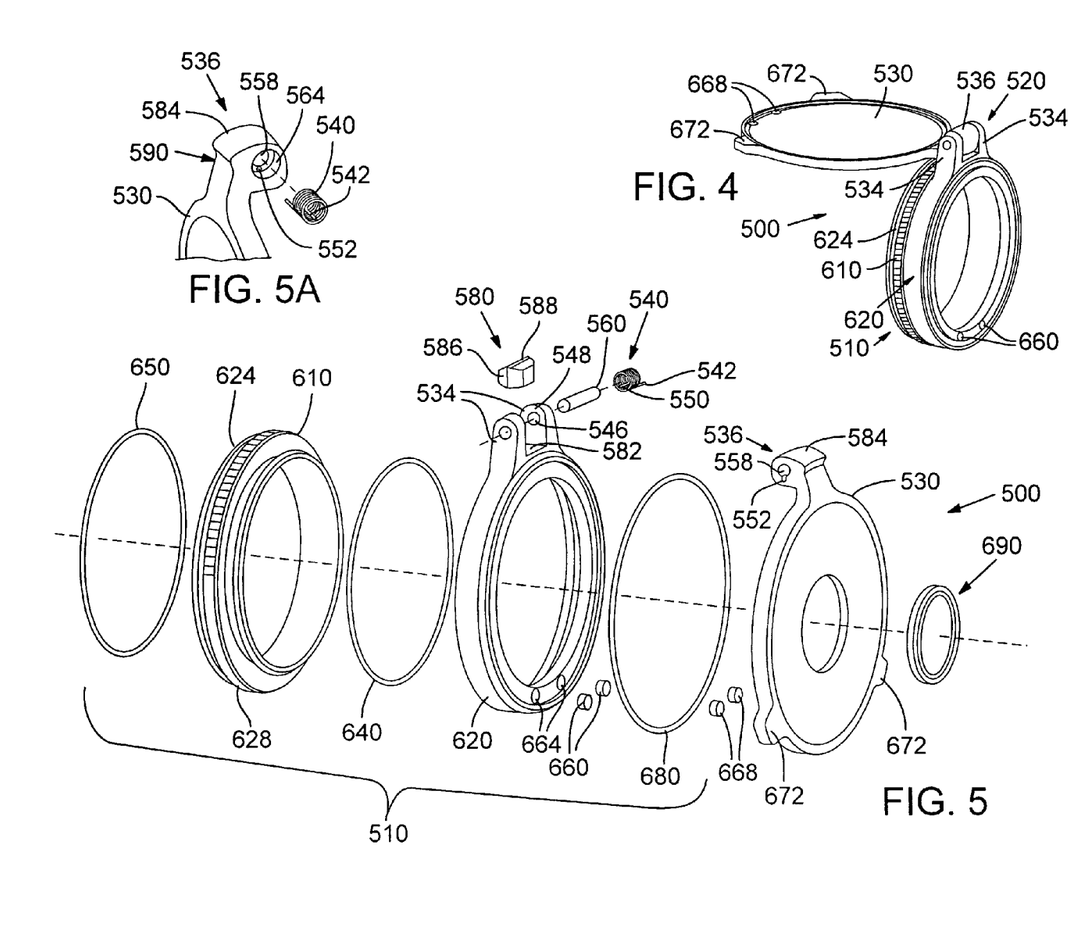
FIG. 4 is a side pictorial view of the cover of FIG. 2 with the pivoting cap shown in its open position.
FIG. 5 is an exploded assembly view of the cover of FIG. 2.
FIG. 5A is an enlarged detail view of the reverse side of a movable hinge portion of the cap of FIG. 5.
Figure 5B:
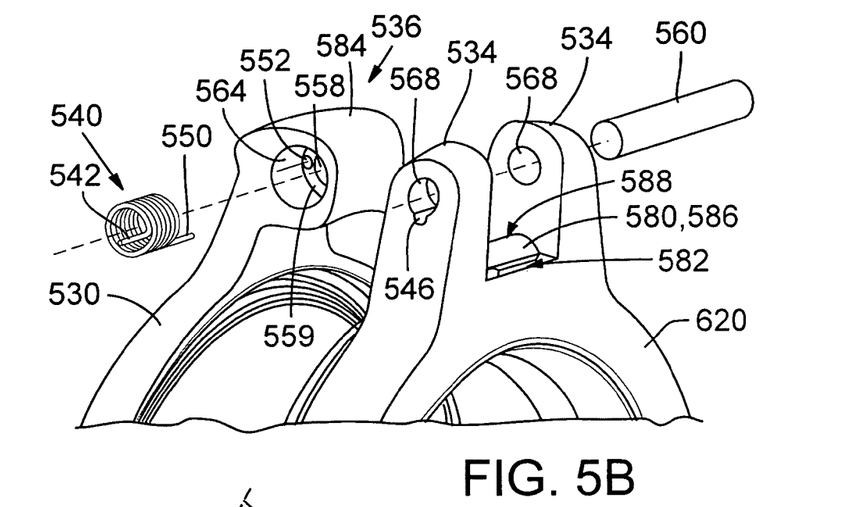
FIG. 5B is an enlarged exploded assembly view showing detail of a spring and hinge assembly of the cover of FIG. 2, with a knurled first mounting ring member omitted.
Figure 6:
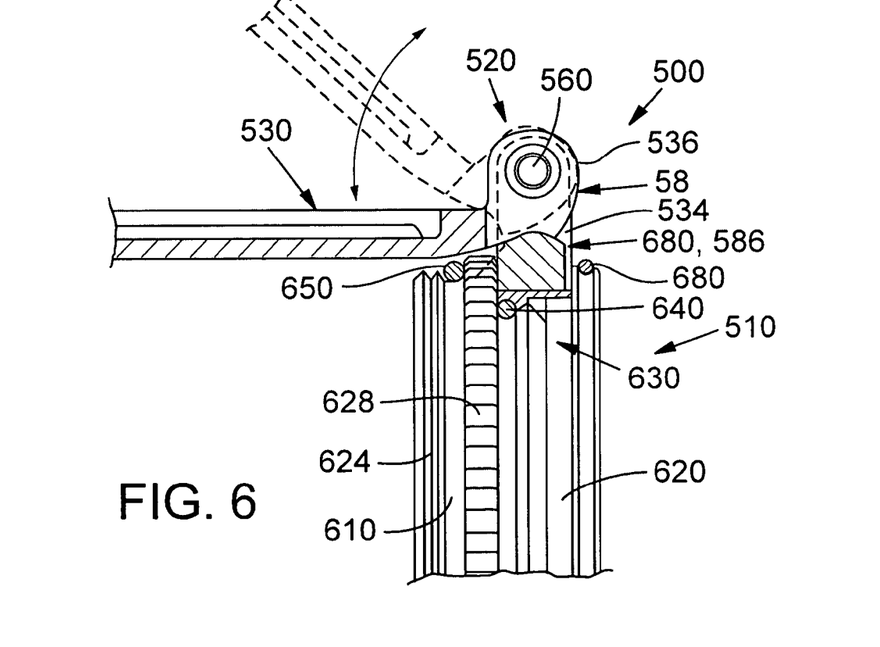
FIG. 6 is an enlarged partial cross section view of the cover of FIG. 2, shown in the fully open position.
Figure 7:
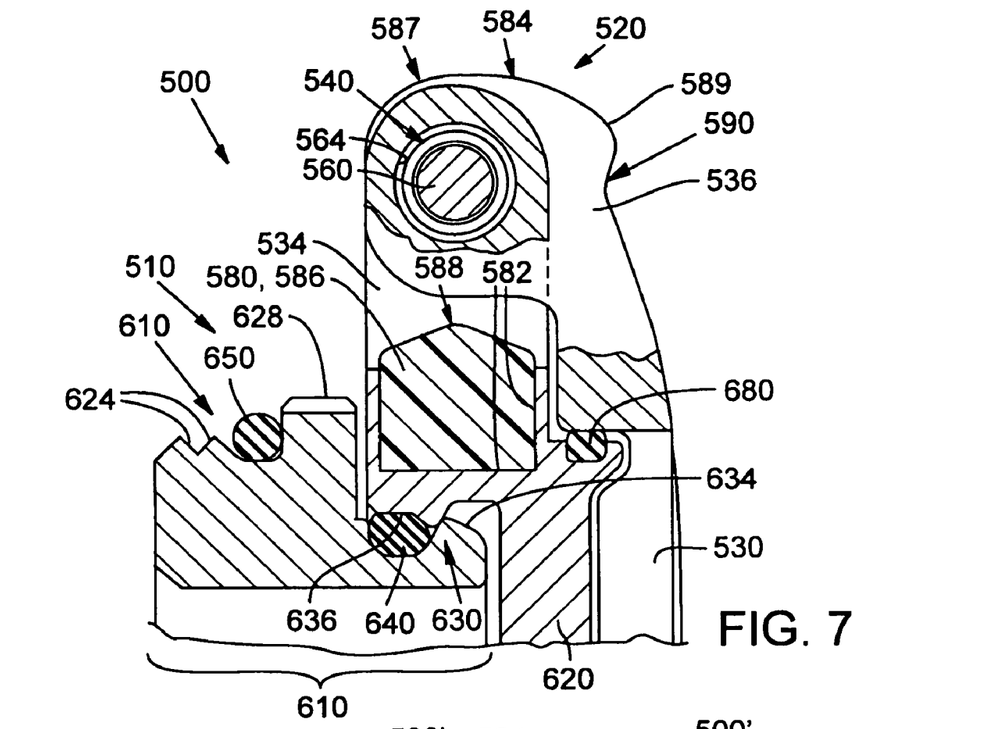
FIG. 7 is an enlarged partial cross section view of the hinge assembly, a mounting ring assembly, and a cushioning device of the cover of FIG. 2, with a pivoting cap of the cover shown in the closed position.

With reference to FIGS. 2-7, lens cover 500 according to a first embodiment comprises a mounting ring assembly 510 supporting a hinge assembly 520 to which a cap 530 is pivotably attached for rotation between a closed position (FIGS. 2, 3, and 7) and an open position (FIGS. 4 and 6). Mounting ring assembly 510 may be adapted for threadably attaching to an eyepiece end or objective end of the housing of optical sighting device 100 (FIG. 1), although other attachment modes, such as a friction fit or snap-fit, may also be utilized. Hinge assembly 520 preferably includes a pair of fixed hinge portions 534 spaced apart along the mounting ring assembly to form a clevis or other similar structure that pivotably supports a movable hinge portion 536 extending from cap 530. In an alternative embodiment (not shown), mounting ring assembly 510 may be omitted and one or more fixed hinge portions 534 of hinge assembly 520 may be formed as part of the housing of optical sighting device 100.

FIGS. 8-13 show further embodiments of cover 500', 500", 500''', wherein reference numerals similar to those of FIGS. 2-7 denote similar parts. For example, in FIGS. 3 and 10, reference numeral 510' denotes a mounting ring assembly in accordance with a second embodiment; and in FIGS. 11-13, reference numeral 530''' denotes a cap in accordance with a different embodiment. The written description of the first embodiment (FIGS. 2-7) is, in general, also applicable to the embodiments of FIGS. 8-13, notwithstanding the lack of specific reference to FIGS. 8-13. However, differences between the embodiments will be evident from the figures and, in some instances, expressly described herein.

With particular reference to FIGS. 5, 5A, and 5B, hinge assembly 520 may include an enclosed spring 540 for biasing cap 530 toward the open position. Spring 540 may be of the helical torsion spring variety, with a first axially-extending leg 542 that engages a keyway 546 or offset hole in an inner surface 548 (FIG. 5) of one of the fixed hinge portions 534 of the clevis. A second axially-extending leg 550 of spring 540 engages a small offset drive hole 552 in movable hinge portion 536 adjacent a central bore 558 which is sized to receive a dowel pin 560 about which cap 530 pivots. Movable hinge portion 536 also includes a counter bore 564 (FIG. 5A) that is sized to loosely receive the main body of spring 540 therein. Counter bore 564 includes a base or shelf 559 (FIG. 5B) that overlaps drive hole 552. Dowel pin 560 extends through central bore 558 and spring 540, and is press-fit or otherwise tightly secured at its ends to fixed hinge portions 534 via dowel support holes 568 (FIG. 5B) formed therein. Thus, in the embodiments shown in the figures, cap 530 pivots about a pivot axis that is coincident with the axial centerline of dowel pin 560, transverse to the longitudinal axis of mounting ring assembly 510, and generally transverse to the optical path of the optical sighting device 100 (FIG. 1) on which cover 500 is mounted.

With reference to FIGS. 5, 5B, 6, 7, 10, and 13, cover 500 may also include a cushioning device 580 or other stop device that engages an outer surface 584 of movable hinge portion 536 of cap 530 during at least a portion of the spring-driven movement of cap 530 from its closed position toward its open position. The cushioning device 580 may include a block, wedge, or other insert 586 of resilient or elastomeric material seated in a pocket 582 formed in mounting ring assembly 510 adjacent fixed hinge portions 534, generally in alignment with the pivot axis of cap 530. An outer surface 584 of movable hinge portion 536 rubs against cushioning device 580 during at least a portion of the movement of cap 530 to thereby brake the movement of cap 530. In an alternative embodiment (not shown), cushioning device 580 or another form of stop device may be mounted on movable hinge portion 536 or another part of cap 530 for engaging one or more of fixed hinge portions 534 or another part of mounting ring assembly 520.

In the embodiment shown in the figures, outer surface 584 of hinge portion 536 extends generally around dowel pin 560 and may have an irregular non-cylindrical curvature for contacting cushioning device 580 with sufficient force and contact area to generate a substantial frictional drag over at least a portion of the pivoting travel of cap 530. In some embodiments, the outer surface includes one or more flats 587 that may serve as regions of low friction by providing clearance for cushioning device 580 or by only lightly contacting cushioning device 580 as cap 530 is pivoted. The frictional drag profile generated as outer surface 584 rides over cushioning device 580 may cooperate with the biasing force profile generated by spring 540 (which may vary over the same pivoting travel path), to thereby facilitate fast and reliable opening of cap 530 while preventing noise during opening of cap 530. The frictional drag profile may be such that, when cap 530 opens under spring force, cap 530 is stopped short of the fully open position. For example, a stop rib 589 may be provided along outer surface 584 for stopping cap 530 at an intermediate position between approximately 10° and approximately 90° from horizontal, before cap 530 strikes the side of the housing of optical sighting device 100, as depicted by phantom lines in FIG. 6. More preferably cap 530 may be stopped by cushioning device 580 at a position between approximately 15° and 45° from horizontal or between approximately 30° and 40° from horizontal. Thereafter, cap 530 may be manually pivoted to the fully open position by rotating stop rib 589 past a ridge 588 of cushioning device 580, as shown in FIGS. 4, 6, 8-10, 12, and 13.

Figure 10:
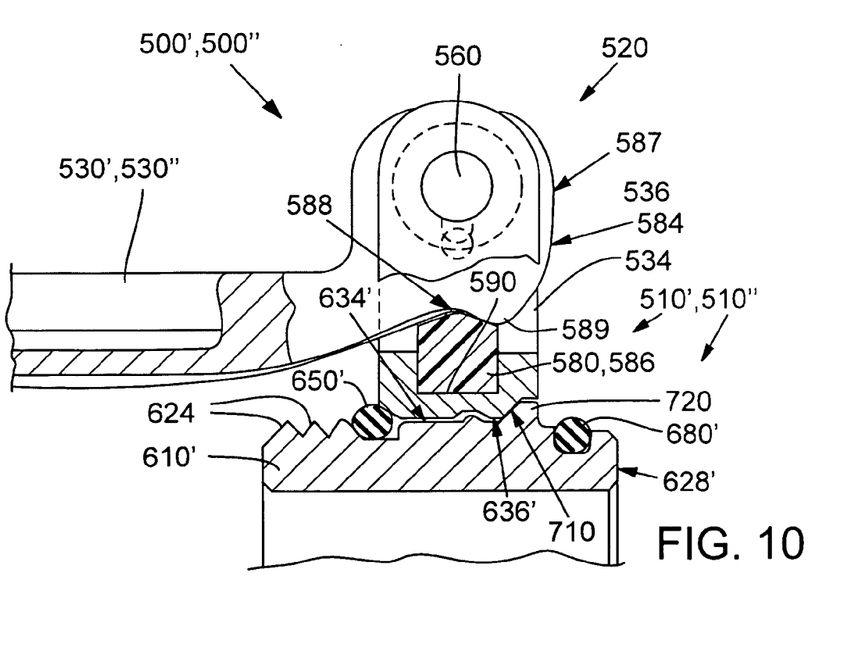
FIG. 10 is an enlarged partial cross section view of a hinge assembly, mounting ring assembly, and cushioning device of the covers of FIGS. 8 and 9, in accordance with the second embodiment.
Figure 13:
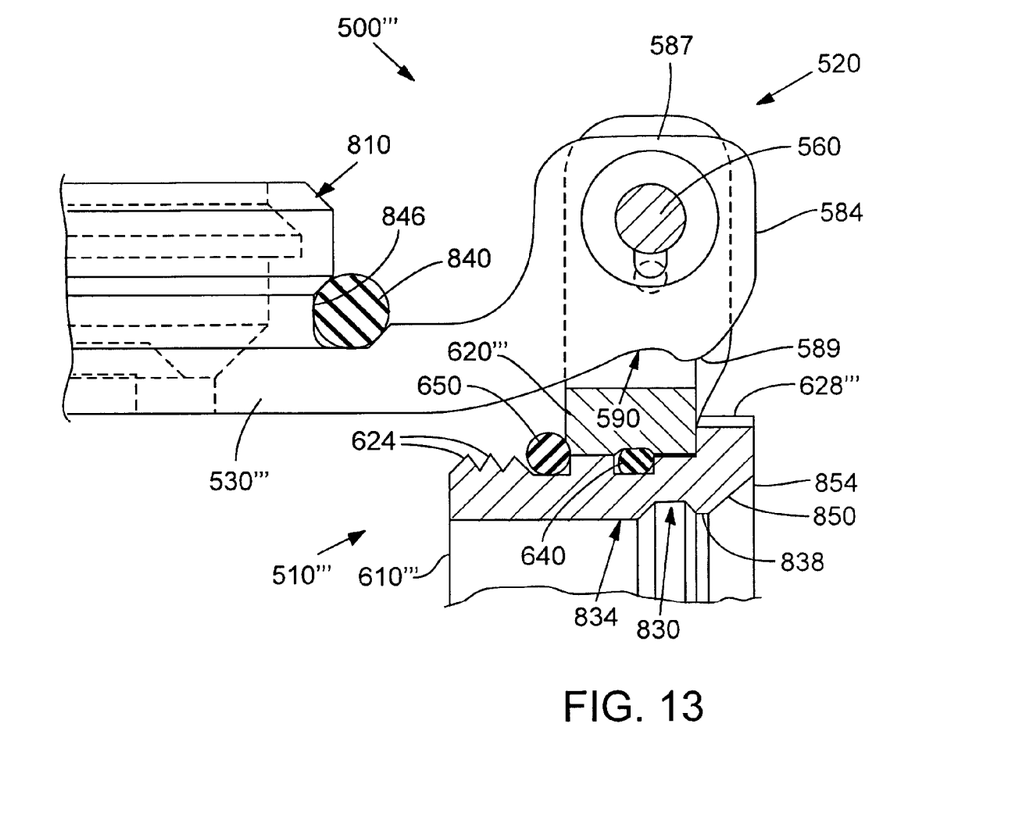
FIG. 13 is an enlarged partial cross section view of a hinge assembly, mounting ring assembly and cushioning device of the cover of FIG. 12.

The ridge 588 of cushioning device 580 may function as a detent ridge that comprises part of a detent structure together with a detent notch 590 formed in movable hinge portion 536, for releasably retaining cap 530 in the open position. When cap 530 is manually pivoted to the fully-open position the detent structure may be moved into engagement, as shown in FIGS. 6, 10, and 13. In an alternative embodiment (not shown), the detent structure is reversed so that the detent ridge is formed on the movable hinge portion 536 and the detent notch is formed on the cushioning device 580. The detent structure is released by manually pivoting cap 530, toward the closed position.

With reference to FIGS. 2-7, in a first embodiment, mounting ring assembly 510 may include a first ring member 610 rotatably coupled to a second ring member 620 on which a portion of the hinge assembly 520 is formed or supported. First ring member 610 may include external (male) threads 624 that are sized to mate with internal (female) threads in the housing of optical sighting device 100 (FIG. 1). First and/or second ring members 610, 620 may further include a knurled outer surface 628 to facilitate manual attachment and removal of mounting ring assembly 510 on optical sighting device 100. Second ring member 620 may be snap fit to the first ring member 610, to form a sliding coupling therebetween such that the pivot axis of the second ring member 620 is coincident with the center of the first ring member 610. First and second ring members 610 and 620 may include respective first and second lead-in surfaces 634, 636 that function as a pilot for snap-fit structures 630, to prevent misalignment of first and second ring members 610 and 620 during assembly.

The rotatable second ring member 620 allows the position of the hinge assembly 520 to be selectively moved clockwise or counter-clockwise to a desired position relative to optical sighting device 100 when the first ring member 610 is threaded onto optical sighting device 100. Thus, the mounting ring assembly 510 allows a user to selectively orient the angle of the pivot path along which cap 530 swings when it is opened and closed, relative to optical sighting device 100. After selectively positioning second ring member 620 and hinge assembly 520, first ring member 610 can be tightened to secure the position of second ring member 620 and hinge assembly 520 and to prevent inadvertent rotation of second ring member 620 relative to optical sighting device 100.

Figure 8:
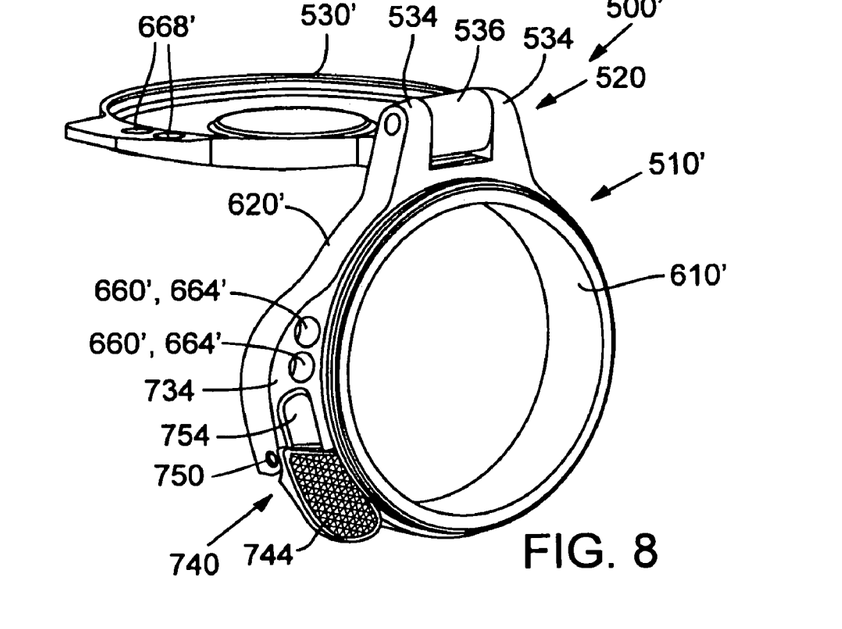
FIG. 8 is a pictorial view of a cover for an eyepiece of an optical sighting device in accordance with the a second embodiment, with a pivoting cap of the cover shown in a fully open position.
Figure 9:
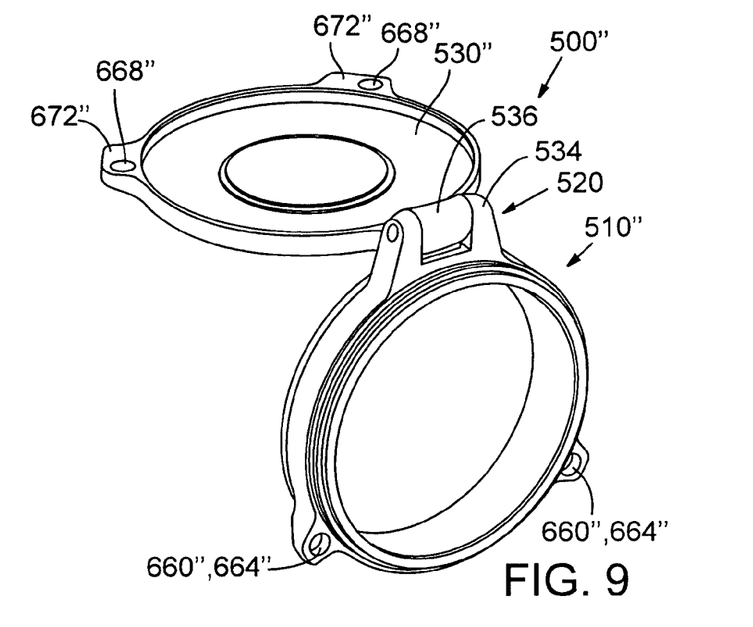
FIG. 9 is a pictorial view of a cover for an objective of an optical sighting device in accordance with the second embodiment, with a pivoting cap of the cover shown in a fully open position.

In the embodiment of FIGS. 8-10, mounting ring assemblies 510', 510" each include a first ring member 610' that extends through a second ring member 620'. First ring member 610' includes, at one end, male threads 624 for mounting to female threads of optical sighting device 100 and, at its other end, a cap o-ring 680' for sealing cap 530', 530" when in the closed position. A self-centering arrangement for cap 530', 530", relative to first ring member 610' includes an annular chamfer 720 formed in first ring member 610', which presses against an annular bearing surface or shoulder 710 of second ring member 620'. (In other embodiments, chamfer 720 and shoulder 710 may be reversed.) This compact self-centering design facilitates a watertight fit and promotes consistent frictional retention of cap 530 via cap o-ring 680'. It also allows an inside diameter of mounting ring assembly 510', 510" (i.e., of first mounting ring 610') that is larger than the inside diameter required for a comparable mounting ring assembly 510 of FIGS. 2-7.

Skilled persons will appreciate that the size of the rings 610, 610', 620, 620' may be dependent on the size of the eyepiece housing or objective housing of optical sighting device 100 to which the cover is attached, and that many different sizes of covers may be made available to fit the many different riflescope and optical device designs on the market. Covers with threads 624 of different sizes and pitches may also be made available for the same reason.

A face knurl 628' may be provided at the second end of first ring member 610' or on the 45-degree chamfer running around the outer diameter of the second end, to facilitate manual tightening of mounting ring assembly 510', 510" to the housing of optical sighting device 100. When first ring member 610' is tightened, second ring member 620' compresses a scope o-ring 650' against a rim of the objective or eyepiece opening of optical sighting device 100, thereby effecting a watertight seal. Tightening of first ring member 610' may also secure second ring member 620' in a desired rotational position relative to optical sighting device 100.

Mounting ring assembly 510, pivoting cap 530, and hinge assembly 520 may be formed of metal, which may enhance durability and result in an improved fit for watertight sealing. The metal used for mounting ring assembly 510, pivoting cap 530 and hinge assembly 520 may be aluminum, so that their rates of thermal expansion are matched to that of the aluminum material commonly used for housings of riflescopes and other optical devices. By matching the rates of thermal expansion and contraction, a secure watertight fit is further facilitated between the lens cover 500 and the riflescope 100. Cap 530 may be marked or fitted with a logo medallion 690, which may also be formed of like metal. Alternatively, mounting ring assembly 510, pivoting cap 530, and hinge assembly 520 may be formed of molded plastic or another suitable material. In still other embodiments, cap 530 may include a lens or filter, such as a colored or polarized filter, allowing optical sighting device 100 to be used even when cap 530 is in the closed position.

With reference to FIGS. 2-7 and 11-13, a friction o-ring 640 may be interposed between first and second ring members 610 and 620 to control the friction of the clock-like movement of the second ring member 620 relative to the first ring member 610. Friction o-ring 640 may also provide a watertight seal between first and second rings 610 and 620. (In the embodiment of FIGS. 8-10, scope o-ring 650' may serve both of these functions.) A scope o-ring 650 may be provided between the first ring member 610 and the housing of optical sighting device 100 for providing a watertight fit therebetween. One or more of the o-rings of the various embodiments may be greased to facilitate sliding and a watertight fit.

One or more mounting ring magnet inserts 660 may be provided in blind bores 664 formed in the face of second ring member 620. Similarly, one or more cap magnet inserts 668 may be installed in cap 530 in alignment with ring magnet inserts 660 for holding cap 530 in the closed position via magnetic attraction between the magnets 660, 668. In some embodiments, blind bores 664 and magnets 660, 668 may be positioned radially inboard of snap-fit structures 630 of ring members 610 and 620, as depicted in FIGS. 4 and 5. In other embodiments, such as those shown in FIGS. 8 and 9, magnets 660', 660", 668', 668" are positioned radially outboard of such snap-fit structures to allow the inner diameter of mounting ring assembly 510', 510" to be increased, thereby preventing interference with the optical path of optical sighting device 100.

As shown in FIGS. 2-7, 9, and 11-12, cap 530 may include one or more radially extending tabs 672 for facilitating manual lifting of cap 530 from the closed position. In the embodiment of FIG. 9, the tabs 672" also provide real estate for mounting of magnets 668".

A cap sealing o-ring 680 may be interposed between inner and outer annular surfaces of the respective cap 530 and second ring member 620. Cap sealing o-ring 680 may prevent water and dust getting past the cap when it is closed and may also provide increased friction that resists the spring force and helps hold cap 530 in the closed position.

The cover 500' of FIG. 8 includes a thumb release 730 for opening cap 530 in a manner that is particularly well suited for an eyepiece of a riflescope, although it may also be useful on objective lenses and with other optical devices. When mounted to an eyepiece of a riflescope, thumb release 730 may be reachable with the thumb of the shooter's trigger hand. Thumb release 730 comprises a flange 734 extending radially outward from second ring member 620' on which is supported a lever 740 including a button 744 with a knurled surface that can be depressed with a user's thumb or finger to open cap 530. Depressing button 744 causes lever 740 to rock about a pivot pin 750 and a driving end 754 of lever 740 to pry cap 530 away from the face of mounting ring assembly 510', thereby breaking the seal of o-ring 680 (FIGS. 5-7) and magnetic attraction between magnets 660' and 668' and allowing the cap 530 to be thereafter driven toward the open position by spring 540 of hinge assembly 520. A similar thumb-lever mechanism may be employed to open a spring catch of the embodiment shown in FIGS. 11-13.

Figure 11:
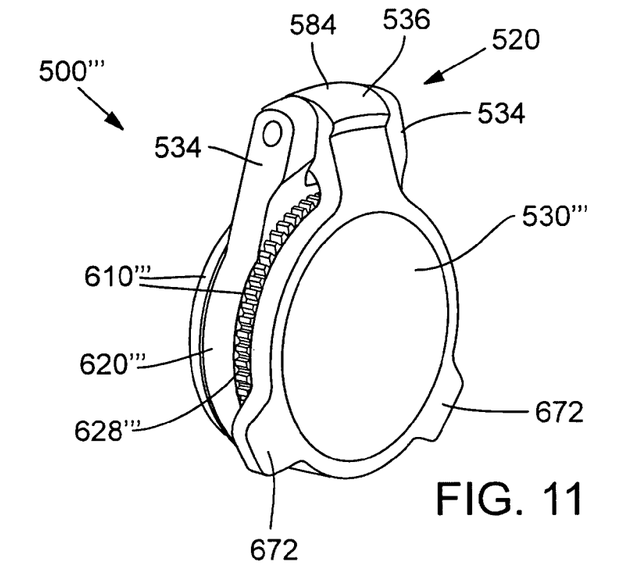
FIG. 11 is a front pictorial view of a cover in accordance with a third embodiment, with a cap of the cover shown in a closed position.
Figure 12:
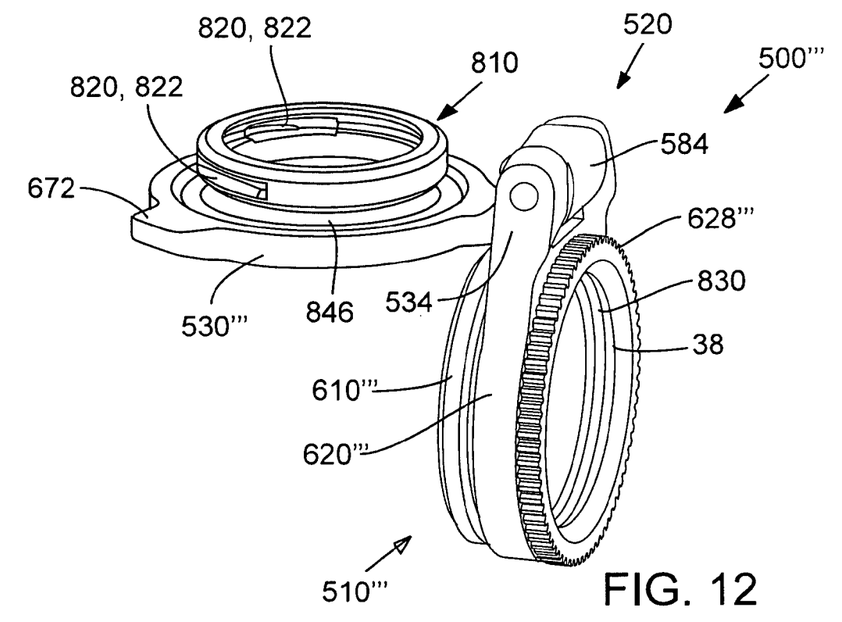
FIG. 12 is a front-side pictorial view of the cover of FIG. 11, with the cap shown in its fully open position.

With reference to FIGS. 11-13, cover 500''' includes a cap 530''' having a central plug section 810 that extends from an inner face of cap 530''' so as to fit within mounting ring assembly 510''' when cap 530''' is in the closed position (FIG. 11). Plug section 810 includes one or more spring catches 820 comprising C-springs 822 that bow outwardly from a periphery of plug section 810 to snap into mounting ring assembly 510''' and seat in a circumferential groove 830 formed along an inner surface 834 of first mounting ring member 610'''. In the closed position, the spring force of hinge assembly 520 tends to bias cap 530''' toward the open position, causing C-springs to bear against a lip 838 in first mounting ring member 610''' bordering groove 830. The spring catch arrangement of cover 500''' replaces the magnets of the embodiments of FIGS. 2-10 and may, therefore, be less expensive to manufacture. It also provides a positive snap-action fit when closed. In an alternative embodiment (not shown), the C-springs 822 of spring catch 820 may be mounted to the mounting ring assembly 510''' instead of the cap 530''', whereby the C-springs 822 engage a groove in the cap 530''' and releasably retain cap 530''' in the closed position. A cap o-ring 840 (FIG. 13) is disposed in a circumferential groove 846 formed around plug section 810. When cap 530''' is closed, cap o-ring 840 seats against a sealing chamfer 850 extending along an outer rim 854 of first ring member 610'''.

It will be obvious to those having skill in the art that many changes may be made to the details of the above-described embodiments without departing from the underlying principles of the invention. The scope of the present invention should, therefore, be determined only by the claims.

The invention claimed is:

1. A pivoting lens cover, comprising:
   a lens cap adapted to be pivotably supported on an optical device for movement along a swing path between a closed position, in which the lens cap covers a lens of an optical device, and an open position, in which the lens cap is away from a lens;
   a spring operatively engaging the lens cap for driving the lens cap toward the open position;
   a stop positioned to interfere with spring-driven movement of the lens cap along at least a portion of the swing path and to brake the lens cap at an intermediate position between the open position and the closed position, the stop allowing manual movement of the lens cap from the intermediate position to the open position; and
   a detent structure that releasably engages when the lens cap is in the open position to releasably retain the lens cap in the open position.

2. The lens cover of claim 1, wherein the lens cap is formed to generate frictional drag with the stop for at least a portion of the swing path between the closed position and the intermediate position as the lens cap moves from the closed position to the intermediate position.

3. The lens cover of claim 1, in which the detent structure includes a detent ridge formed in the stop and a detent groove formed in the lens cap that engages the detent ridge when the lens cap is in the open position.

4. The lens cover of claim 1, in which the lens cap is made of metal.

5. The lens cover of claim 1, further comprising a mounting ring assembly adapted for attachment to a housing of the optical device, the lens cap being pivotably supported on the mounting ring assembly.

6. The lens cover of claim 5, in which the mounting ring assembly includes a threaded mounting ring that threadably attaches to mounting threads of the housing.

7. A riflescope including the lens cover of claim 1.

8. A pivoting lens cover for an optical sighting device including a housing with threads adjacent a lens of the optical sighting device, comprising:
   a threaded mounting ring for attachment to the threads of the optical sighting device;
   a lens cap;
   a hinge assembly rotatably coupling the lens cap to the threaded mounting ring for lens cap rotation between a closed position, in which the lens cap covers a lens, and an open position, in which the lens cap is away from a lens;
   the hinge assembly being supported on the threaded mounting ring for rotation relative to the threaded mounting ring about an axis extending through a center of the mounting ring to allow the hinge assembly to be positioned at a desired angular position relative to the optical sighting device when the threaded mounting ring is not tightened to the housing; and
   the hinge assembly being supported on the threaded mounting ring to substantially prevent the hinge assembly from rotating from a desired angular position relative to the optical sighting device when the threaded mounting ring is tightened to the housing.

9. The lens cover of claim 8, in which the mounting ring has an outer diameter that is approximately the same as or less than an outer diameter of the housing of the optical sighting device.

10. The lens cover of claim 8, further comprising a second ring slidably coupled to the mounting ring for rotation relative to the mounting ring about the axis extending through a center of the mounting ring, the hinge assembly being attached to the second ring.

11. The lens cover of claim 8, in which the lens cap is made of metal.

12. A riflescope including the lens cover of claim 8.

13. A pivoting lens cover, comprising:
   a mounting ring assembly including:
   a first ring member adapted to be attached to an optical sighting device, wherein the first ring member ranges from loosely attached to the optical sighting device to securely attached to the optical sighting device;
   a second ring member rotatably coupled to the first ring member, the second ring member adapted to range from substantially freely rotatable to substantially non-rotatable as the first ring ranges from loosely attached to the optical sighting device to securely attached to the optical sighting device; and
   a lens cap pivotably supported on the second ring member for rotation between a closed position, in which the lens cap covers a lens, and an open position, in which the lens cap is away from a lens.

14. The lens cover of claim 13, further comprising a magnet operably interposed between the optical device and the lens cap for releasably holding the lens cap in the closed position.

15. The lens cover of claim 13 further comprising a resilient seal interposed between the lens cap and the second ring member, the seal providing a friction fit that helps to releasably hold the lens cap in the closed position.

16. The pivoting lens cover of claim 13 in which the first and second ring members and the lens cap are made of metal.

17. The lens cover of claim 13, in which the lens cap includes a filter.

18. A riflescope including the lens cover of claim 13.

19. A pivoting lens cover, comprising:
a first ring member having an inner and outer diameter, the first ring member adapted to be securely attached to an optical sighting device;
a second ring member rotatably coupled to the first ring member for rotation about an axis extending through a center of the first ring member, the second ring member being coupled about an outer circumference of the first ring member; and
a lens cap pivotably supported on the second ring member for movement along a swing path between a closed position, in which the lens cap engages the first ring member and covers a lens of the optical device, and an open position, in which the lens cap is away from a lens.

20. The lens cover of claim 19 further comprising a spring operatively engaging the lens cap for driving the lens cap toward the open position.

21. The lens cover of claim 20 further comprising a release button that, when depressed, drives the lens cap away from the closed position to overcome the holding effect of the engagement between the lens cap and the first ring member to allow the spring to drive the lens cap toward the open position.

22. The lens cover of claim 20, further comprising a magnet operably interposed between the optical sighting device and the lens cap for releasably holding the lens cap in the closed position.

23. The lens cover of claim 19, further comprising:
a first centering structure on the first ring member; and
a second centering structure on the second ring member; wherein
the first and second centering structures are formed to engage one another to align the second ring member on the first ring member.

24. The lens cover of claim 23, wherein alignment between the second ring member and the first ring member facilitates a watertight fit between the lens cap and the first ring member.

25. A riflescope including the lens cover of claim 19.

* * * * *